United States Patent [19]
Levine, Arnold M.

[11] 3,991,417
[45] Nov. 9, 1976

[54] MTI CANCELLER UTILIZING FIBER OPTIC DELAY MEDIUM AND FREQUENCY REITERATION

[75] Inventor: Levine, Arnold M., Chatsworth, Calif.

[73] Assignee: International Telephone and Telegraph Corporation, New York, N.Y.

[22] Filed: May 1, 1975

[21] Appl. No.: 573,782

[52] U.S. Cl. ............................ 343/7.7; 250/227; 350/96 B
[51] Int. Cl.² .................................. G01S 9/42
[58] Field of Search .......... 343/7.7; 350/96 R, 96 B; 250/227

[56] References Cited
UNITED STATES PATENTS

| | | | |
|---|---|---|---|
| 3,134,101 | 5/1964 | Dickey | 343/7.7 |
| 3,428,815 | 2/1969 | Thompson | 350/96 R X |
| 3,493,288 | 2/1970 | Kaufman et al. | 350/96 B X |
| 3,502,388 | 3/1970 | Mary | 350/96 B |
| 3,684,346 | 8/1972 | Lang | 350/96 B |
| 3,785,716 | 1/1974 | Maurer | 350/96 R X |
| 3,787,842 | 1/1974 | Thomas | 343/7.7 X |
| 3,925,727 | 12/1975 | Duguay | 350/96 B X |

Primary Examiner—T.H. Tubbesing
Attorney, Agent, or Firm—William T. O'Neil

[57] ABSTRACT

A pulse cancellation system, particularly adapted to moving target indicator (radar) stationary signal cancelling equipment. A cancelling circuit which is basically a signal differencing device compares the signal train within a given scan cycle with that of the previous cycle by delaying the signals of said previous cycle in order to bring them into time coincidence in the canceller circuit. Delay is achieved in a stable electrooptical device by modulating a light source, preferably a laser beam, in accordance with the signal train to be delayed. Signals are passed through a fused silica fiber optic cable, detected at the other end of the cable, remodulated onto a source of a different optical frequency (color) and retransmitted back over the same fiber optic delay means. Several such reiterations can be effected to reduce the amount of delay required in the fiber optic cable. After the last such reiteration the final color transmission is detected and sent to the canceller to be subtracted from signals provided to the canceller directly from the MTI radar receiver output (undelayed).

10 Claims, 1 Drawing Figure

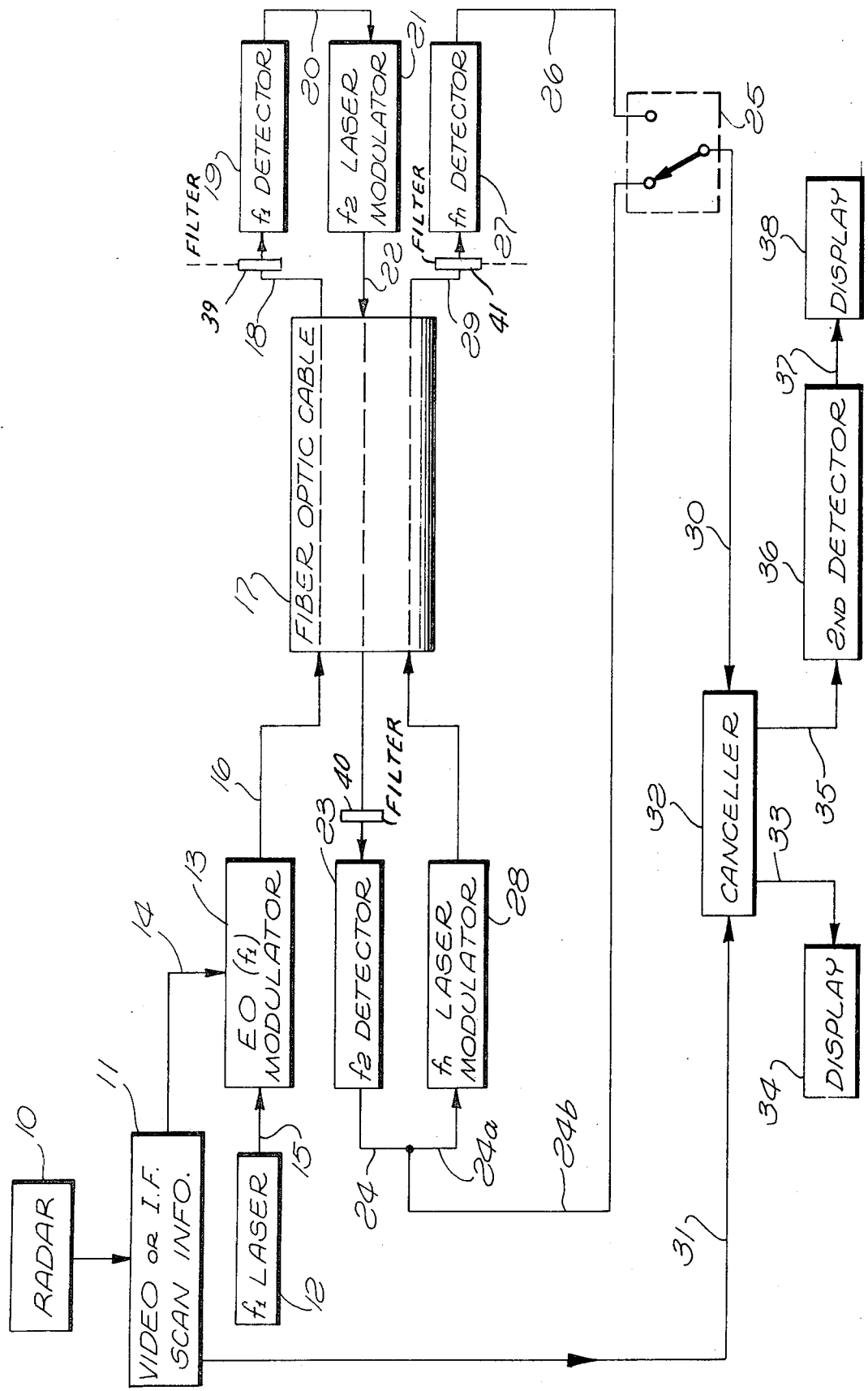

3,991,417

MTI CANCELLER UTILIZING FIBER OPTIC DELAY MEDIUM AND FREQUENCY REITERATION

BACKGROUND OF THE INVENTION

1. Field of the Invention

The invention relates generally to selective pulse cancellation in a train of signals, and more particularly, to such systems as MTI radar in which a moving target is identified among plural fixed targets by accurate comparison of signals between successive received signal trains.

2. Description of the Prior Art

The instrumentations and techniques for MTI radar had their beginning relatively early in the radar arts. In general, the purpose of moving target indication radar (MTI) is the rejection of signals from fixed unwanted targets such as terrain features and buildings or other manmade structures, and the retention for detection or display, only those signals from moving targets such as aircraft. The elimination or substantial elimination of fixed target responses from a radar display is a great aid in the observation and tracking of moving targets.

A relatively up-to-date summary of the published state of the art in MTI radar is contained in Chapter 17 of the text "Radar Handbook" by Merrill I. Skolnik (McGraw Hill 1970). The material therein is supported by generous bibliographical references, so that the reader not entirely familiar with the relatively current state of the prior art can inform himself accordingly.

Although most MTI radar devices involve electronic processing either in the analog or digital category, it is also possible to effect optical processing as will be seen hereinafter in the description of the present invention.

Prior art analog processing for fixed target cancellation in MTI radar systems has been limited by the very stringent stability requirements, particularly for the delay device involved. Use has been made of the many-sided quartz crystal operating as a resonant device broadbanded by mechanical means. Such devices operate at IF frequencies, and involve cancellation on an IF cycle-to-cycle basis. Any change in delay (phase) characteristics causes a deterioration in MTI capability. Other devices, such as surface wave and sonic delay lines, have been also employed, but in general, they suffer from the same general limitations.

Obviously, MTI cancellation can be conducted at video frequencies, however, another problem here presents itself, in that it is difficult to provide the required amount of delay in a device of reasonable size. Although video cancellers are inherently less critical in respect to the stability requirement, in that cycle-to-cycle cancellation is not involved at an RF or IF frequency, nevertheless, delay instability or drift deteriorates the quality of cancellation.

The optical sources, modulators, detectors and related components are well known of themselves. The aforementioned "Radar Handbook" text describes the state of the arts in respect to those devices, particularly in Chapter 37 thereof.

The manner in which the present invention deals with the problems in the prior art to provide a novel analog system with optical signal processing will be evident as this description proceeds.

SUMMARY OF THE INVENTION

The combination of the present invention basically makes use of the fact that optical energy transmission time in a fused silica fiber optic cable is extremely stable and relatively free of the effects of variations in temperature and other environmental parameters. Moreover, such fiber optic cables are low in cost and transmit light energy with relatively little attenuation.

To overcome the fact that such cables would be required to be excessively long in order to provide an adequate delay time for use in an MTI system of relatively low pulse sampling rate, the present invention proposes to reduce this required cable length to a more manageable and economical length by color reiteration in the optical delay medium. That is, the first pulse train (first scan) is detected and used to modulate an optical modulator operating on the beam of a light source, preferably a laser generator. This first laser source is of a selected color and after passing through the fiber optic cable is detected, using a light filter of relatively narrow passband embracing the frequency (color) of this first laser. The output of this first detector is then used to modulate another optical source of a different color which is re-entered into the fiber optic cable and detected at the opposite end thereof, also with a suitable filter so that the second detector responds only to the frequency (color) of this second modulated light source. The process is repeated up to an nth color until an adequate number of reiterations takes place to establish the required delay time for cancellation against the following scan (video train).

Although the system of the present invention is adapted to either video or IF domain operation, use of video is somewhat simpler.

A description of a practical device for implementing the present invention will be understood from the description hereinafter.

BRIEF DESCRIPTION OF THE DRAWING

A single FIGURE drawing comprising a schematic block diagram of a system according to the present invention, is illustrated.

DESCRIPTION OF THE PREFERRED EMBODIMENT

Referring now to the drawing, a radar 10 will be understood to be of the pulse type having a predetermined repetition rate. The output of radar 10 is provided in video or IF form from block 11 (actually a receiver device). The outputs from block 11, namely 14 and 31, are essentially the same video signal train provided to electro-optical modulator 13 and canceller 32, respectively. Thus, at the input lead 31 to canceller 32, an undelayed video train is applied.

Although the combination of the present invention is not limited to laser devices, it is being described, assuming that laser sources are used.

The signal 14 is applied to an electro-optical modulator 13 which applies intensity (amplitude) modulation to the $f_1$ laser signal generated at lead 15 by laser unit 12. This $f_1$ laser is to be understood to provide a first color so that the output signal 16 from the modulator 13 is an amplitude modulated substantially monochromatic light signal, the said modulation thereon reflecting the pulse train on lead 14. The optical signal 16 is conducted from one end to the other through the fiber optic cable 17 and is entered into an $f_1$ detector 19 via lead 18. At the output 20 of detector 19, the signal is once again converted to electrical impulse train form and from there it is used to modulate $f_2$ laser-modulator 21. A modulated laser beam of a different color is introduced via 22 to the fiber optic cable 17 and after passing therethrough is detected by $f_2$ detector in block 23. The same process is repeated again in respect to an $f_n$ laser color in the laser modulator 28 reflecting the electrical signal on 24 and 24a. Passed once again through fiber optic cable 17, it is detected in the $f_n$ detector 27 to which it is applied along light conductive lead 29.

It will be realized, that the diagram is simplified in that there may well be many more "reiterations" through cable 17 so that $f_n$ is the nth color, n being a larger number than the 3rd ordinal inferred in the drawing. It will be realized at this point in the description that the fiber optic cable 17 need only be $\tau/n$ in length, where $\tau$ is the reciprocal of the pulse repetition frequency of the radar 10.

Laser-modulators 28 and 21 actually comprise a laser source and a modulator comparable to those separately illustrated at 12 and 13 in respect to $f_1$. Since the output of a laser device is coherent (monochromatic) light energy, each of the modulators is necessarily excited from a discrete and separate laser source. It is also to be understood that each of the detectors, typically 19, 23 and 27, comprises an optical filter element 39, 40 and 41 respectively, of a well known type so that it responds only to the corresponding laser color emitted by its corresponding laser-modulator.

The switch 25, which may in practice be a fast acting electronically controlled switch, provides for the selection, as illustrated, of the electrical output of detector 23 or detector 27, alternatively, to constitute the signal on lead 30 against which the signal 31 is compared in canceller 32. This arrangement is intended to indicate the manner of accommodating variable or staggered pulse repetition rates from the radar 10. Quite obviously, it would be expected that more reiterations between $f_1$ and $f_2$ beams would be expected in a practical system, but since the drawing is illustrative only, it will be readily realized that the switch 25 can readily be arranged to select between whatever stages of reiteration would correspond to the cancellation delays required by the corresponding discrete pulse repetition intervals in the variable PRF situation. Still further, it will be obvious that the switch 25 might be a multiple selector if the PRF variation were such that more than two discrete pulse repetition intervals were involved in the PRF programming of radar 10.

The output of the canceller 32 will now be understood to be MTI video, fixed target cancellation having been accomplished within 32. If the cancellation process, and for that matter, the modulation and detection process hereinabove described, is carried on in the IF realm, the canceller output shown at 35 would be in the IF domain and a second detector 36 is required to reduce the signals to video form at 37 for display on a standard type of cathode-ray display 38. If, however, the system is constructed to operate at video frequencies beginning on leads 14 and 31, then a video output signal from canceller 32 is extant on 33 and may be directly displayed on indicator display 34, which is to be understood to be the same type of display as 38, and in fact, would be used in lieu of 38.

Those skilled in this art will realize that the present invention provides a means of instrumenting the cancellation process in the video domain, the color reiteration scheme making it possible to construct a practical optical delay line of reasonable size. Still further, operation in the video realm reduces the overall stability requirement of such a system considerably, in that cancellation need not be effected on a cyclefor-cycle basis at IF frequency, but rather may be accomplished over the actual video waveform of a given individual signal.

It will be realized that image combining means, such as provided by half-silvered mirrors, can be used at the point of introduction of the modulated light energy signals into the cable 17. It is also possible however, to simply branch the optical fibers of the cable 17 into as many input and output connection as are necessary.

It will also be realized that the fiber optic cable 17 is not being used to connect points remote from each other, but rather the two ends of such a cable delay line can be made available in close physical proximity to each other. Accordingly, although the successive reiterations at their corresponding light colors are shown passing through cable 17 in alternate directions, it is also possible to provide for their passage in the same direction, thus grouping the detectors all at the other end of cable 17. If light combining or beam splitting means as, for example, by the aforementioned half-silvered mirror arrangement are to be provided, some obvious practical simplifications are possible if one end of cable 17 is designated as the input end and the other as the output end.

In addition to the foregoing, those skilled in this art will quickly realize, once the principles of the present invention are understood, that other sources of light can be used in lieu of laser sources, as described. For example, LED sources, fitted with appropriate optical filters in order to predetermine their light output color may be used in lieu of laser sources. Still further, a broadband light source, such as generated through fluorescence of well known light emissive materials could be employed. The light output of such a device may be concentrated and split into spectral components by diffraction to produce the discrete plural color sources required.

The system described will be seen to have obvious applications in communications, telemetry, or other multiplexing arrangements for the utilization of fiber optic cable capabilities.

Various other modifications and variations in the specific structure and application of the present invention will suggest themselves to those skilled in this art. Accordingly, it is not intended that the present invention should be considered limited to the embodiment described and illustrated, the description and drawing being illustrative only.

What is claimed is:

1. In a pulsed MTI radar system providing successive groups of first signal trains at a predetermined pulse repetition frequency, each of said signal trains containing signals representative of radar echoes from objects within the corresponding contemporaneous range and angle coverage of said radar system, the combination comprising:

a source of light energy;

delay means responsive to said first signal trains to produce corresponding delayed signal trains each delayed by one repetition period, said repetition period being defined as the reciprocal of said repetition frequency;

means within said delay means including a fiber optic delay line, at least one electro-optic modulator responsive to said source of light energy and to said first signal trains to produce corresponding first intensity modulated light energy signals and for applying said first light energy signals to a first end of said fiber optic delay line, and electro-optic detector means connected to the second end of said fiber optic delay line to convert said first light energy signals to electrical signals thereby providing said delayed signal trains;

and canceller means responsive to said first signal trains and said delayed signal trains to provide a difference signal from which signals corresponding to the same range position within successive ones of said repetition periods are cancelled.

2. In a pulsed MTI radar system providing successive groups of first signal trains at a predetermined pulse repetition frequency, each of said signal trains containing signals representative of radar echoes from objects within the corresponding contemporaneous range and angle coverage of said radar system, the combination comprising:

a source of light energy;

delay means responsive to said first signal trains to produce corresponding delayed signal trains each delayed by one repetition period, said repetition period being defined as the reciprocal of said repetition frequency;

means within said delay means including a fiber optic delay line, at least one electro-optic modulator responsive to said source of light energy and to said first signal trains to produce corresponding first intensity modulated light energy signals and for applying said first light energy signals to a first end of said fiber optic delay line, and electro-optic detector means connected to the second end of said fiber optic delay line to convert said first light energy signals to electrical signals thereby providing said delayed signal trains;

optical signal recirculation means associated with said delay means for directing said intensity modulated light signals through said fiber optic delay line at least twice successively to increase the total available delay for a given length of said fiber optic delay line;

and canceller means responsive to said first signal trains and said delayed signal trains to provide a difference signal from which signals corresponding to the same range position within successive ones of said repetition periods are cancelled.

3. A system according to claim 2 in which there are included a plurality of electro-optic modulators and an equal plurality of electrooptic detectors, a first one of said modulators being responsive to said first signal trains and the corresponding one of said detectors providing the input to the next one of said modulators, each succeeding one of said detectors providing the input to the next of said modulators, until the last detector, said last detector providing said delayed signal trains; each of said modulators being arranged to input modulated light energy to said optic delay line, the corresponding one of said detectors being disposed at the opposite end of said delay line.

4. A system according to claim 3 in which said source of light energy comprises means for providing light energy of a separate frequency to each of said modulators, and means are provided associated with each of said detectors to insure its response substantially only to the light frequency of the corresponding modulator.

5. A system as defined in claim 4 in which said means for providing light energy of a separate frequency to each of said modulators comprises a separate laser source of a discrete color supplied to each of said modulators.

6. A system according to claim 5 in which said means associated with each of said detectors to insure its response substantially only to the light frequency of the corresponding modulator includes bandpass optical filter means substantially centered on the frequency of the corresponding light energy transmitted through the corresponding one of said modulators.

7. A system according to claim 4 in which said means associated with each of said detectors to insure its response substantially only to the light frequency of the corresponding modulator includes bandpass optical filter means substantially centered on the frequency of the corresponding laser energy transmitted through the corresponding one of said modulators.

8. A device for the elimination of signals within a recurrent signal train which exhibit substantially no relative time position change from one recurrence of said signal train to another, comprising:

first conversion means responsive to said signal train for converting it to a corresponding intensity modulated light energy signal of a first color;

delay line means responsive to said modulated light signal from said first conversion means comprising a fiber optic cable having a light energy transmission time equal to $\tau/n$, where $\tau$ = the period of each of said recurrent signal trains;

a first detector circuit arranged to be responsive substantially only to light energy of said first color for receiving light energy through said delay line means and for reconverting it to an electrical signal train;

($n-1$) additional electrical signal-to-light converters and corresponding detector circuits arranged to function cooperatively with respect to said delay line means substantially the same as said first conversion means and first detector circuit except each operating with a light frequency different from said first color, said additional converters and corresponding detectors operating in a serial manner to provide each detector output as an input for the next electrical signal-to-light converter to provide successive transmission n times and said delay line means each in a discrete light color, the output of the last detector providing an electrical signal train delayed $\tau$ in time with respect to the undelayed signal train at the input of said first conversion means;

and canceller means responsive to said delayed and undelayed signal trains to produce a signal train which is substantially the difference between said delayed and undelayed signal trains.

9. Apparatus according to claim 8 in which the means for producing said n light colors each comprises a laser beam generator.

10. Apparatus according to claim 8 in which said fiber optic cable is further defined as comprising a plurality of strands of fused silica fibers.

* * * * *